United States Patent Office 2,982,604
Patented Apr. 25, 1961

2,982,604

PREPARATION OF NEPTUNIUM HEXAFLUORIDE

Glenn T. Seaborg, Berkeley, Calif., and Harrison S. Brown, Chicago, Ill., assignors to the United States of America as represented by the United States Atomic Energy Commission No Drawing. Filed Oct. 17, 1947, Ser. No. 780,584

8 Claims. (Cl. 23—14.5)

This invention relates to a halide of hexavalent neptunium, namely, a new composition of matter known as neptunium hexafluoride, and to a method for its preparation.

An object of this invention is to provide, as a new composition of matter, a higher fluoride of neptunium, namely, neptunium hexafluoride, and to provide a method whereby such a compound may be prepared.

In accordance with the process of this invention, the fluoride of hexavalent neptunium is prepared by contacting a lower fluoride of neptunium or a mixture of lower fluorides of neptunium with elemental fluorine at an elevated temperature. Throughout this specification and in the appended claims, the term "lower fluoride of neptunium" is used to designate a fluoride of element 93 in which said element has an oxidation number or valence not in excess of +4. Neptunium trifluoride, ($NpF_3$), and neptunium tetrafluoride, ($NpF_4$), are neptunium lower fluorides which are the products of the reaction between neptunium oxide (or compounds readily converted by heat to the oxides) with hydrogen fluoride. Neptunium trifluoride is produced whenever such reactions take place in the presence of a reducing agent such as hydrogen, while the fluoride of tetravalent neptunium is produced as a product of the reaction between neptunium oxide and hydrogen fluoride in the presence of an oxidizing agent such as oxygen. Either of these lower fluorides of neptunium may be converted to the higher fluoride of neptunium by the process of this invention. The term "neptunium higher fluoride" is used to designate a fluoride of element 93 in which the valence or oxidation number of element 93 is greater than +4.

In accordance with the process of this invention for the preparation of a higher fluoride of neptunium, a lower fluoride of neptunium, preferably neptunium trifluoride, is heated with fluorine at a temperature above normal room temperature and preferably at a temperature between 150 and 1000° C. while in contact with elemental fluorine gas.

We have found that neptunium hexafluoride is readily prepared by fluorinating a lower fluoride of neptunium supported on an electrically heated metal filament. A chemically inert metal such as nickel is a suitable filamentary material which is preferably heated to red heat, thereby effecting a speedy reaction between the lower fluoride and the fluorine gas. It is preferred to have the fluorine gas present in the system at about one atmosphere pressure.

The following example is given to illustrate the invention.

Example I

The fluorination apparatus used consisted of a brass manifold connected in series with a quartz or glass reaction chamber containing an electrically heated nickel filament. The glass surface surrounding the filament was cooled by circulating liquid oxygen in contact with the outer surface.

Prior to preparation of the hexafluoride, the reaction chamber was alternately subjected to a high vacuum, and heated in the presence of fluorine and again heated in high vacuum to insure complete dryness.

A 0.4-mg. sample of neptunium trifluoride, obtained in a fine state of subdivision by igniting neptunium dioxalate at 700° C. with an equimolar mixture of anhydrous hydrogen fluoride and hydrogen at 550° C., was placed in a depression within the nickel filament and the apparatus was again degassed. Fluorine containing less than 2% oxygen and other impurities was then passed over copper turnings in a glass tube immersed in liquid oxygen in order to remove any hydrogen fluoride impurity and passed through the reaction chamber at approximately one atmosphere pressure during which time the filament was heated to redness for about fifteen seconds. The product of the reaction was volatile and condensed on the surface of the reaction tube which was cooled by liquid oxygen in contact with the outside of the vessel. The condensate was a mass of brownish-white crystals. The liquid oxygen was removed from around the reaction chamber and as the surface of the reaction chamber warmed to room temperature the volatile product sublimed from the walls of the reactor and was carried in a slow stream of fluorine gas into a thin-walled capillary immersed in a Dry Ice-acetone mixture. The flow of fluorine gas was discontinued, the system evacuated, and the thin-walled capillary containing the recondensed reaction product was sealed off.

The X-ray diffraction pattern showed that the above sample contained a single phase consisting of a hexafluoride having the $UF_6$ type of structure. The substance is orthorhombic and contained 4 molecules per unit cell. The lattice dimensions are as follows:

$$a_1 = 9.91 \pm .02 \text{ A.}$$
$$a_2 = 8.97 \pm .02 \text{ A.}$$
$$a_3 = 5.21 \pm .02 \text{ A.}$$

and the calculated density is $\rho = 5$. The space group is Pnma ($D_{2h}^{16}$). The atomic radius of neptunium is about 0.01 A. smaller than that of uranium, which fact is further confirmation of the observed similarity between the lattice dimensions of $UF_6$ and $NpF_6$. The hexafluorides have a typical molecular structure and lattice dimensions are thus determined both by the X–F distances within the molecule and by the distances between fluorine atoms of different molecules. The distance Np–F is smaller than U–F but the fluorine-to-fluorine distances for atoms belonging to different molecules are greater in neptunium hexafluoride than in uranium hexafluoride. As a consequence the Van der Waals binding is weaker in neptunium hexafluoride than in uranium hexafluoride; thus neptunium hexafluoride is expected to be the more volatile. Volatility of neptunium hexafluoride is evidenced by the fact that even at room temperature the compound tends to condense in the cooler portion of the X-ray capillary.

The volatility of this compound, ($NpF_6$), is one of its more marked characteristics which property is utilized as set forth in our copending application, S.N. 474,063, filed January 30, 1943, now U.S. Patent No. 2,833,617, issued May 6, 1958, of which the instant application is a continuation-in-part. In this patent, a method is disclosed for the separation of plutonium, neptunium, and uranium by volatilization and fractional distillation of their respective hexafluorides.

The melting point of neptunium hexafluoride is 53° C. under its own pressure at that temperature. The product is also somewhat corrosive as evidenced by its tendency to etch the glass in which it is contained.

The example in this specification is set forth solely for purposes of illustration and is not to be construed

What is claimed is:

1. A method of preparing neptunium hexafluoride comprising contacting a lower fluoride of neptunium with fluorine at an elevated temperature.

2. A method of preparing neptunium hexafluoride comprising contacting a lower fluoride of neptunium with fluorine at a temperature between 150 and 1000° C.

3. A method of fluorinating a lower fluoride of neptunium comprising heating said lower fluoride in contact with a metal filament in the presence of gaseous fluorine to form neptunium hexafluoride.

4. The process of claim 3 wherein the metal of said filament is nickel.

5. A method of fluorinating a lower fluoride of neptunium comprising heating said lower fluoride in contact with a metal filament at red heat in the presence of gaseous fluorine to form neptunium hexafluoride.

6. A method of preparing neptunium hexafluoride comprising contacting neptunium trifluoride with fluorine at an elevated temperature.

7. A method of preparing neptunium hexafluoride comprising contacting neptunium tetrafluoride with fluorine at an elevated temperature.

8. A method of preparing neptunium hexafluoride comprising contacting a mixture of neptunium trifluoride and neptunium tetrafluoride with fluorine at an elevated temperature.

References Cited in the file of this patent

Friend: Textbook of Inorganic Chemistry, vol. 7, part 3, page 292 (1926). Pub. by Charles Griffin and Co., London. Copy in Scientific Library.

McMillan et al.: Physical Review, vol. 57, pages 1185–1186 (1940). Copy in Sci. Lib.

Seaborg: Chemical and Engineering News, vol. 23, No, 23, pages 2190–2193 (1945). Copy in Sci. Lib.

Fried et al.: The Basic Dry Chemistry of Neptunium, MDDC–1332, July 18, 1947, pages 5 and 18. United States Atomic Energy Commission, Technical Information Division, Oak Ridge, Tenn.

Seaborg and Wahl: Journal of the American Chemical Society, vol. 70, pages 1128–1134 (1948). Report first submitted on March 1, 1942, and this date relied upon. Copy in Sci. Lib.